O. D. COLLIS.
METALLIC SHELVING.
APPLICATION FILED MAR. 1, 1909.
1,004,996.
Patented Oct. 3, 1911.
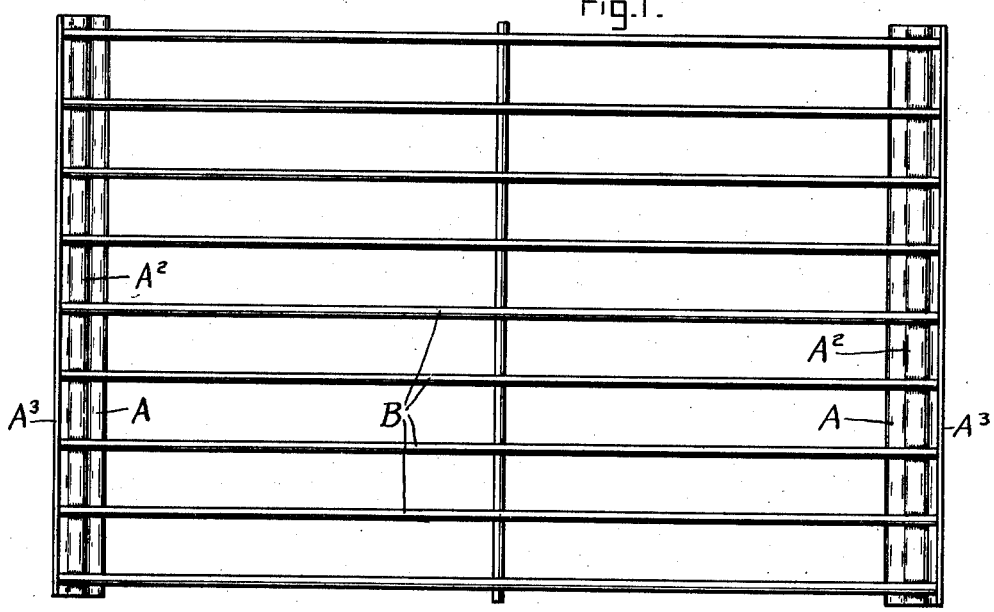
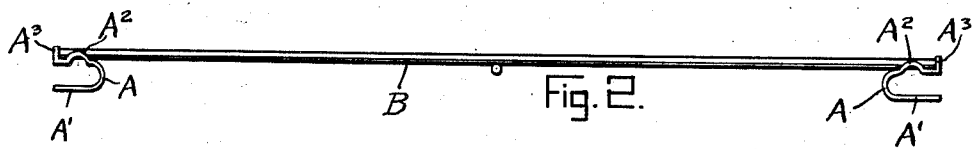
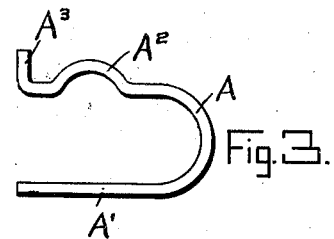 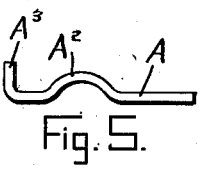
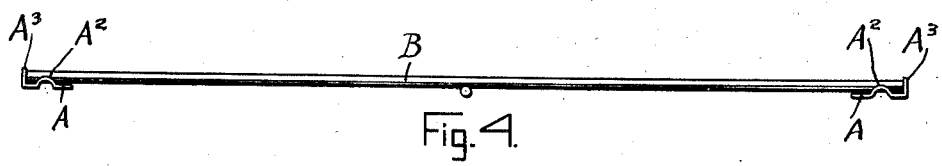
Witnesses
C. K. Reichenbach.
H. E. Stonebraker.
Inventor
Oliver Dallyn Collis,
By R. S. Dyrenforth
his Attorney

UNITED STATES PATENT OFFICE.

OLIVER DALLYN COLLIS, OF DUBUQUE, IOWA, ASSIGNOR TO THE COLLIS COMPANY, OF DUBUQUE, IOWA, A CORPORATION OF IOWA.

METALLIC SHELVING.

1,004,996.   Specification of Letters Patent.   Patented Oct. 3, 1911.

Application filed March 1, 1909. Serial No. 480,518.

*To all whom it may concern:*

Be it known that I, OLIVER D. COLLIS, a citizen of the United States, residing at Dubuque, in the county of Dubuque and State of Iowa, have invented certain new and useful Improvements in Metallic Shelving; and I do hereby declare the following to be a full, clear, and exact description of the invention, such as will enable others skilled in the art to which it appertains to make and use the same.

My invention relates to improvements in metallic shelving, to be used in connection with refrigerators, stoves, and similar structures.

My invention has to do with that type of shelf which is constructed by securing a plurality of rods, to side bars of sheet metal, the rods being welded to the bars in any suitable manner.

The object of my improvement is to provide an economic method for manufacturing shelves of this type, the resultant product being characterized by greater strength and rigidity than heretofore.

Preferably, I weld the rods to the side bars by means of electrical processes, and another object of my invention is to so construct the side bars, that the welding surfaces of the side bars shall be comparatively small, at the point of union, whereby to effect a better weld, and greatly reinforced structure.

Briefly, the present structure comprehends a side bar having a corrugation running longitudinally thereof, and lateral rods which are first placed upon the highest portion of said corrugation, and then electrically welded thereto. By pressure of the contacts, the rods are forced into and partially through the corrugation, while the metal is at a welding heat, so that the rods are surrounded for a considerable portion of their circumference, with metal which constitutes a very strong reinforced structure.

With these several objects and advantages in view, the invention in its preferred embodiment, includes the form of construction described in detail in the specification hereinafter, and fully pointed out in the appended claims.

In the accompanying drawings, forming a part of this specification, and wherein like reference characters refer to corresponding parts in the several views, Figure I is a top plan view of a shelf constructed according to my present improvement; Fig. II is an end elevation of the same; Fig. III is a detail view in end elevation of one of the side bars employed in constructing the shelf; Fig. IV is an end elevation of a slightly modified form of device; and Fig. V is a detail view in end elevation of a side bar used in the construction disclosed in Fig. IV.

Referring more in detail to the drawings, the shelf includes two side bars A, with a plurality of lateral rods B, preferably of wire, attached thereto in the manner about to be mentioned. The side bar A is formed of sheet metal, having a bottom portion A' which constitutes a support for the shelf.

$A^2$ designates a corrugation or raised portion running longitudinally of the side bar, and upon its upper surface, as clearly shown in Figs. II and III.

$A^3$ is a vertically extending flange for a purpose about to be described.

The lateral rods B are first placed in contacting position upon the corrugations $A^2$, and then secured thereto preferably by a process of electric welding, such as is common to this and allied arts. When the metals are brought up to the welding heat, and pressure is applied upon the rods B at the point of jointure, the bars are forced into the corrugation, and caused to penetrate, slightly, the thickness of the side bar A, the soft metal forming a reinforcing coating around the rod. When the two metals are first brought together, the contacting surfaces of the rod and side bar are comparatively small, owing to the curved surface upon each, and a much more satisfactory union is thereby effected. This is a decided advantage, as distinguished from structures in which a rod is welded or otherwise united to a substantially flat surface, and the finished product is stiffer and stronger in every way, its rigidity being almost the same as though it were an integral structure.

The flange $A^3$ is provided, to afford a shield against the rough ends of the rods B, and besides affording a much neater and better appearing product, it also assists in giving stiffness to the shelf.

In Figs. IV and V I have disclosed a slightly modified form of construction in which the lower portion A' is dispensed with, the side bar A being substantially in the form of a flat bar, provided with the corrugation A² and flange A³ as in the form already described. The most important feature of the construction, which characterizes any of the possible forms, is the corrugation or indented part A², affording a raised surface for contacting with the lateral rods, whereby the welding surfaces of both contacting parts are comparatively small.

Without specifying particularly the various modifications and changes in which the features of my invention may be embodied I desire it to be understood that the precise construction here set forth is merely for the purpose of showing a method of construction, and is not intended as a limitation of the invention to the construction disclosed. It is to be understood that any such departures from the construction herein shown are to be included within the scope and spirit of the invention, and the claims hereto appended.

What I desire to secure by Letters-Patent and claim is:

1. A metallic shelf of the character described, including side bars having upward corrugated portions extending longitudinally thereof, and rods secured to the upward corrugated portions, said side bars being provided with flanges adjacent the ends of the rods.

2. A metallic shelf of the character described, including side bars having upward corrugated portions extending longitudinally thereof, and rods united to the upward corrugated portions, said side bars being provided with flanges adjacent the ends of the rods.

3. A metallic shelf comprising a plurality of side-members each formed with a body-portion and with a continuous longitudinally-extending ridge, and rods secured to said ridges and embedded therein transversely of the same in a plane above the outer surface of the body-portions of said members.

4. A metallic shelf, including a plurality of side-members, each formed with a body-portion and with a continuous and longitudinally-extending ridge, and rods embedded in said ridges and welded thereon and occupying a plane above that of the body-portion of said side-members.

5. A metallic shelf, including a plurality of side-members each of which comprises a body-portion and a longitudinally-extending ridge, and rods secured to the ridges of each of said side-members and welded thereon and occupying a plane above that of said body-portion.

6. A metallic shelf, including a plurality of side-bars arranged in parallelism and each corrugated throughout its length to form a longitudinally-extending ridge, and comprising a body-portion, and a series of rods secured equidistantly to and welded in said ridges transversely of said corrugations and occupying a plane above that of the body-portions of said bars.

7. A metallic shelf, including a plurality of side-bars each formed with a longitudinally-extending ridge and provided with a supporting-portion and with a shield-portion, and a series of rods embedded in said ridges and overlying said supporting-portion.

8. A metallic shelf including a plurality of side-bars each provided with a longitudinally-extending ridge and formed with a shield-portion and a supporting-portion, and a series of rods embedded in said ridges.

9. As an article of manufacture, a metallic shelf comprising a plurality of side-members each formed with a longitudinally-extending ridge and provided with a supporting-portion and with a shield-portion, and a series of bars embedded in said ridges and abutting the shield-portions of said side-members.

10. As an article of manufacture, a metallic shelf comprising a plurality of side-members each formed with a longitudinally-extending ridge and provided with a shield-portion at one side of said ridge and a supporting-portion extending from the other side of said ridge, and a series of transversely extending members connecting with and embedded in the ridges of said side-members.

11. As an article of manufacture, a metallic shelf comprising a plurality of side-members each formed with a longitudinally-extending ridge and provided with a flange extending parallel with said ridge, and formed with a supporting-portion at the side of the member opposite to said flange, and a series of transversely extending supporting members connecting with and embedded in said ridges.

12. As a new article of manufacture, a metallic shelf comprising a plurality of side-members each formed with longitudinally-extending ridges and provided, at one side of said ridges, with a shield-flange, and at the opposite side thereof with a supporting-portion, and a series of supporting members connecting with and embedded in said ridges and so positioned thereon as to abut against said shield-flange and to overlie said supporting portions of the side-members.

13. As a new article of manufacture, a metallic shelf comprising a plurality of side-members each formed with longitudinally-extending ridges and provided, at one side of said ridges, with a shield-flange, and at the opposite side thereof with a supporting-portion, a series of supporting members connecting with and embedded in said ridges and so positioned thereon as to abut against said shield-flange and to overlie said supporting portions of the side-members, and an intermediate strengthening member extending at an angle to said supporting member.

14. As an article of manufacture, a shelf comprising side-members each formed with a longitudinally-extending ridge and provided at one side thereof with a shield-flange arranged parallel with said ridge and also provided with a supporting-portion at the opposite side thereof, and a rod embedded in said ridge and engaging with said shield-flange.

15. As a new article of manufacture, a shelf comprising side-members each formed with a longitudinally-extending ridge and provided, at one side of said ridge, with an upstanding flange, and at the opposite side of said ridge, with a supporting-portion bent to underlie the ridged portion of said member, and a rod embedded in said ridge and overlying said supporting-portion.

In testimony whereof, I affix my signature, in the presence of two subscribing witnesses.

OLIVER DALLYN COLLIS.

Witnesses:
MARY T. TAYLOR,
H. E. STONEBRAKER.